Patented Oct. 4, 1938

2,132,005

UNITED STATES PATENT OFFICE 2,132,005

ARTICLE OF CERAMIC BONDED ABRASIVE MATERIAL AND METHOD OF MAKING THE SAME

Lowell H. Milligan and Robert H. Lombard, Worcester, Mass., assignors to Norton Company, Worcester, Mass., a corporation of Massachusetts No Drawing. Application October 19, 1936, Serial No. 106,368. In Canada September 16, 1936

15 Claims. (Cl. 51—278)

The invention relates to grinding wheels and other abrasive articles of ceramic bonded abrasive materials and methods of making the same. This application is a continuation in part of our co-pending application Serial No. 42,672 filed September 28, 1935.

One object of the invention is to avoid detrimental oxidation of the abrasive particles, more particularly silicon carbide, but also other oxidizable abrasives, for example diamonds. Another object of the invention is to prevent significant loss of such abrasive grains or material changes in the physical properties of the grains or the bond. Another object of the invention is to prevent swelling of grinding wheels and other abrasive products and objects made of the abrasive materials mentioned and bonded with ceramic bond.

Another object of the invention is to provide a method of manufacture for articles of the type above indicated permitting a sufficiently high firing temperature to be used to produce an article of the desired characteristics without undue oxidation of the abrasive particles. Another object of the invention is to avoid cracking of the ceramic article or other changes in structure and grade hardness thereof. Another object of the invention is to inhibit the formation of silica by oxidation of silicon carbide, which silica may tend to become part of the bond and so change the chemical nature thereof.

Another object of the invention is to achieve controllable results in the manufacture of articles of the type indicated by preventing reactions during the firing which have heretofore occurred and which have been variable in practice. Another object of the invention is to prevent the formation of gas bubbles from the reaction of the oxidizable abrasive material with the oxygen present in the atmosphere of the kiln. Another object of the invention is to provide for the formation of a substantially bubble-free bond glass. Another object of the invention is to provide material which will react with oxidizing gases formed in ceramic bond itself as it is fired to form solid oxidation products and thereby absorb the gases, preventing swelling, this feature of the invention being particularly applicable in the case of wheels or other products having a high volume percentage of bond and in the case of very dense wheels. Another object of the invention is to provide a method of manufacture and a formula permitting the manufacture of wheels or other products bonded with ceramic bond and having a high volume percentage of bond, for example 25 to 40% by volume, without swelling, incipient cracks or a high proportion of rejections. Another object of the invention is to convert to non-gaseous oxidation products the oxidizing gases liberated by the constituents of the vitrifiable mass during vitrification.

Another object of the invention is to permit the use of a relatively fluid glassy bond for articles of the type indicated. Another object of the invention is to provide an article comprising oxidizable abrasive granules and a ceramic bond in which the granules are very firmly held and substantially completely coated by the bond. Another object of the invention is to permit the use of a bond having a relatively high percentage of a fluid glassy phase and with excellent grain coating characteristics but somewhat stiffened at the maximum firing temperature to prevent too great shrinkage of the article, retaining however the above coating characteristics. Another object of the invention is to provide a method and a formula permitting the use of a greater quantity of fluxing agents. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

We provide a quantity of oxidizable grain. We may use either silicon carbide or diamonds and the invention has special application to the manufacture of silicon carbide abrasive products.

We provide raw ceramic bond which may vary within wide limits, and in it we incorporate a protective agent. Of the various materials which we may employ as protective agents, we prefer to use aluminum and/or silicon or alloys of these two metals. In accordance with certain features of the invention, we may also use such active agents as reduced boron compounds and the like. In general, the materials usually to be employed are those metals and other reducing agents which react preferentially with oxygen or oxidizing gases to form non-gaseous oxidation products. The material to be used will depend upon the nature of the grains and the bond employed. A desirable requirement is that under the conditions of firing, the protective reagent or its oxidation product shall not react deleteriously with the oxidizable abrasive granules, and the protective reagent, by virtue of its chemical reactivity and its physical state of division, should react more readily with oxygen than the oxygen reacts with the refractory oxidizable granules and form oxidation products that are not deleterious.

Both silicon carbide and diamonds are oxidizable by ordinary air and also by air having a deficiency of oxygen, such as is found in kilns at such temperatures as are involved in heat treatment at Orton cone 12, for example. In one of its aspects, this invention applies to firing conditions involving the presence of either air or oxygen, or of other oxidizing gases capable of oxidizing the grains. For instance, mixtures of nitrogen with only a very small amount of oxygen constitute oxidizing conditions, and indeed water vapor or carbon dioxide, even in the absence of free oxygen, may under some conditions produce oxidizing effects and hence be within the scope of the gaseous atmospheres in whose presence the use of a protective agent is desirable.

In the manufacture of abrasive articles with oxidizable abrasive grain and ceramic bond without the protective agent, oxidation of the granules has in many cases heretofore been material and detrimental. Furthermore, the gases generated have caused swelling in the past. We believe that the following is the type of reaction which has occurred with detrimental results:

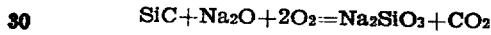
$$SiC + Na_2O + 2O_2 = Na_2SiO_3 + CO_2$$

The above reaction and similar reactions take place less readily at a given firing temperature in the case of the porcelanic types of bonds, such as have heretofore been customarily used in the manufacture of silicon carbide abrasive articles. However, there are distinct advantages in the use of the more fluid bonds and in the use of fluxes, such as a batter coating of the abrasive granules and a greater strength of the bond itself. In the above formula the carbon dioxide liberated by the reaction causes, in the presence of soft or fluid bond, the type of swelling which it is desired to eliminate substantially. The function of the inorganic reducing agent is to combine preferentially with the oxygen on the left-hand side of the equation and thereby to inhibit the proceeding of the reaction from left to right, consequently to decrease the liberation of carbon dioxide which can cause swelling, also protecting the abrasive granules themselves from burning including the dulling of their corners and edges.

Further incidents of the reactions above indicated which our invention avoids are the swelling of the bond into a pumice-like condition and the altering of the characteristics of the bond by the addition thereto of variable amounts of $SiO_2$ liberated at the grain surfaces and resulting from variable oxidation of the abrasive grains.

We select as the protective agent one which will oxidize or combine with the oxygen at the temperature selected for the firing operation, which will depend upon the composition of the bond and the type of product desired. This protective agent is preferably incorporated throughout the bond so that it will be in intimate association with the inter-faces and contact zones between the grains and the bond where it can combine with the oxygen that may be present and thus reduce the attack on the oxidizable grains. It is to be noted that grinding wheels and other abrasive bodies bonded with ceramic bond are commonly and preferably of relatively open or porous structure and whatever gases may be present in the kiln, there is usually in such articles, during firing, a considerable amount of entrapped air. It is desirable to utilize a substance which will not burn too readily but which, because of its chemical reactivity and its physical state of subdivision with respect to the oxidizable refractory granules being bonded, will take the oxygen just before the bond softens and during the subsequent period while the bond is soft.

The extent of oxidation of the oxidizable constituent of the grains depends not only on the nature of the bond itself but also on the size of the refractory grains and the amount of bond present, the nature of the kiln atmosphere, the temperature and rate at which the material is heated, the size and shape of the article, the type of its setting in the furnace, and various other conditions. Thus, silicon carbide articles bonded with a relatively fluid glassy bond and burned under oxidizing conditions tend to swell more readily than those bonded with a more viscous porcelanic bond for several reasons. Primarily, the very reactive fluxes which are usually constituents of fluid glassy bonds cause a greater evolution of gas during the firing operation, with consequent more extensive swelling. Furthermore, in the presence of gas evolution, a fluid glassy bond may swell more easily because it resists deformation less than does a more viscous porcelanic bond. A fluid glassy bond, particularly when used in large amounts relative to the abrasive grains for the production of hard grade articles, also coats the grains more fully than does the other bond and so is capable of entrapping the evolved gases more completely, thus producing the swelling effect. The porcelanic bond does not coat the grains so fully and leaves more chance for the gas to escape. These are reasons why the latter type has been commonly used for silicon carbide bonds. This invention permits the use of the more fluid or glassy types of bonds which contain more fluxes than do the porcelanic bonds.

Furthermore, we have found that there is some reaction or condition in ceramic bonds themselves, particularly in cases where a substantial amount of clay is present, which causes the resultant bond to be porous and to be pumice-like in physical characteristics. This condition heretofore met with has varied, depending upon the composition of the particular bond. We believe that during vitrification some oxidizing gas is present or formed which causes this condition. Possibly the condition may be due to the entrapped air in the clay or other comminuted material. At all events, we have discovered that the use of aluminum and/or silicon or boron (not necessarily pure) in finely divided form and dispersed throughout the bond so reacts with the oxidizing gas or gases to produce a solid oxidation product inhibiting or preventing porosity and the pumice-like condition referred to, thus resulting in a bond of superior strength and density.

We have further found that the presence of powdered aluminum in the more fluid bonds reduces the fluidity of the bond at the firing temperatures employed, making the bond less readily deformable. At the same time, however, desirable physical properties are retained in the product, and the modulus of elasticity and grade hardness are reduced only little by the use of the aluminum.

There are certain distinctions between the different materials specified for protective agents which makes them individually useful in making different types of abrasive articles. We find, for instance, aluminum metal to be particularly useful for silicon carbide articles having the abrasive grains in moderately fine grain sizes. Silicon has been found often to be particularly useful in silicon carbide abrasive articles of coarse grit size. The protective agent to be selected in any given case will depend upon the nature of the other ingredients in the mixture, the firing conditions to be used and the properties desired in the product. Its amount and state of subdivision will be proportioned for eliminating the deleterious oxidation effect on the abrasive granules and also preferably for combining with oxidizable gases in the bond itself to form solid oxidation products, and would preferably be in excess of the exact amount required for both of these purposes.

As a specific example of the practice of our invention, we provide a raw powdered bond of the following composition:

Example I

| | Per cent by weight |
|---|---|
| Feldspar | 55.5 |
| Ball clay | 18.5 |
| Flint | 18.5 |
| Whiting | 2.5 |
| Powdered aluminum | 5.0 |
| Total | 100.0 |

Also we provide a quantity of silicon carbide abrasive grains of #16 grit size. We mix the grains and the bond in the proportion of one pound of the grains to five and one-half ounces of the bond and with sufficient water or other agent to make a plastic and moldable mass which may be shaped as desired. After drying to remove the water, the pressed article is placed in a ceramic kiln and fired under a heat treatment corresponding with Orton cone 12. This particular bond without the aluminum would produce a badly swelled or bloated article which is distorted; but with the 5% of aluminum added thereto, it is not swelled to any material extent and is highly satisfactory.

The proportions of aluminum may be varied widely, and as low as one or two per cent may suffice for combining with the oxidizable gases in the bond itself, but to achieve all functions of the protective agent, as herein explained, it may in some cases be desirable or preferable to employ up to 10 or even up to 15% or more by weight of the aluminum.

The foregoing example is to be interpreted as an example only and especially as bond formulae may be varied widely and the proportion of bond to abrasive is purposely varied to make wheels of different grade hardness. Any one skilled in the art will readily understand how to compound a ceramic bond of the usual ingredients comprising ball clay, slip clay, kaolin, feldspar and flint, and in addition to these, various fluxes such as lime, magnesia etc. may be used as, in the presence of a suitable protective agent, these can be employed in usefully larger amounts than would be possible in the absence of the protective agent because of the accelerated oxidation of the granules and the resultant swelling in the latter case. It may be explained that the use of fluxes to make a fluid bond together with the use of aluminum to reduce the fluidity is not to be considered merely creating a condition and then destroying it in so much as the resultant glassy bond has a greater tendency to flow around and into contact with the abrasive granules than an ordinary porcelanic bond.

As an example showing the use of silicon as the protective agent, silicon carbide grains may be bonded with a bond of the following example, the silicon carbide being, if desired, likewise of 16 grit size and mixed with the bond in the proportions of one pound of silicon carbide to four and one-half ounces of bond.

Example II

| | Per cent by weight | |
|---|---|---|
| Frit { Borax ($Na_4B_2O_7.10H_2O$) | 33.8 | } 75 lbs. |
| Boric acid ($H_3BO_3$) | 26.7 | |
| Ground flint ($SiO_2$) | 39.5 | |
| Ball clay | | 25 lbs. |
| Silicon powder | | 10 lbs. |

The ingredients of this frit are melted together and then granulated by pouring into water while hot or by any suitable method, and then ground to a desired degree of fineness suitable for use in the bond. This article may be fired at a comparatively low temperature in the vicinity of 1000° C. The amount of silicon may be varied widely. This particular bond (claimed as such in a copending application Serial No. 48,694 filed November 7, 1935) used in the proportions specified will produce a swelled article if the silicon metal is absent, but the latter will protect the silicon carbide from oxidation and insure the manufacture of a product which is not swelled to any appreciable or detrimental extent and, furthermore, the bond glass is not in a pumice-like condition and it is considerably stronger than bond glass of the same formula not having the silicon.

The proportions of silicon used may be varied as above stated for Example I in connection with the use of aluminum, and the same applies also in connection with the use of other substances.

As an example of the use of reduced boron compounds, such as are obtained by fusing boric oxide with carbon in an electric furnace, we may choose powdered boron carbide which is believed to function because of the strong avidity of its boron for oxygen. We prepare a bond similar to that of Example II except that the 10 lbs. of silicon powder is replaced by from 2 to 10 lbs. of boron carbide powder ($B_4C$). We make a mixing in accordance with the following weights:

| | Pounds |
|---|---|
| #16 grit size kiln-roasted silicon carbide grains | 113 |
| Bond of above described composition | 25 |
| 2% "Glutoline" solution | 5.3 |

The silicon carbide grains have been given a slight preliminary purification by kiln-roasting, and the "Glutoline" (methyl ether of cellulose) solution constitutes a temporary binder. We mold abrasive products in the customary manner from this mixing and fire them at temperatures in the vicinity of 1000° C. to mature the bond. The products obtained are substantially unswelled and unbloated and significantly different from similar products made with the same mixture but containing no protective agent in The same principles apply to the protection of diamonds. We may form a highly satisfactory grinding wheel of ceramic bonded diamond abrasive in the following manner: Taking a definite weight of diamond grain of #100 mesh size, we moisten them with a 4% water solution of "Glutoline" (methyl ether of cellulose) and then add the bond in the proportion of 21 grams per 100 grams of diamond, and produce an intimate mixture by usual methods. Various bonds may be employed and preferably those which mature the bond.

at a comparatively low temperature, such as 1100° C. or lower. A satisfactory low maturing bond may be made of the following mixture:

*Example III*

|  | Per cent by weight |  |
|---|---|---|
| Frit { | Borax (Na₂B₄O₇.10H₂O)_____ 32.2 | } 75 lbs. |
|  | Boric acid (H₃BO₃)_____ 25.4 |  |
|  | Ground flint (SiO₂)_____ 37.6 |  |
|  | Alumina hydrate (Al₂O₃.3H₂O)_ 1.0 |  |
|  | Whiting (CaCO₃)_____ 3.8 |  |
| Kentucky ball clay_____ 25 lbs. |  |  |
| Powdered aluminum_____ 10 lbs. |  |  |

The powdered frit may be manufactured by fusing a batch of the above composition to a relatively homogeneous fluid glass and then pouring the molten glass into water, drying and ball-milling to a fine powder. This frit is then added to the other ingredients, as specified, to form the bond (claimed as such in a copending application Serial No. 48,694 filed November 7, 1935), whereupon it is mixed with the diamonds, the bond and enough water to plasticize the mass, and then formed into a desired shape with the bond proportioned to give the required density, and preferably a porous structure, after which the pressed product is fired at in the vicinity of 1000° C. in an atmosphere that is essentially nitrogen with only a small amount of oxygen present. This atmosphere is used in preference to ordinary air in order to reduce the amount of work that is required of the protecting agent. The result is a porous and free-cutting grinding wheel having diamond grains securely bonded in place. This wheel is capable of grinding the hardest materials such as cemented carbides, molded boron carbide etc.

As a further example of the practice of our invention, we may take a definite weight of silicon carbide abrasive grain of #80 grit size. The grain is mixed with a small amount of a temporary binder such as powdered dextrine, and is then moistened with a little water, after which bond of the composition given in Example III is thoroughly mixed with it in the proportion of two and one-eighth ounces of bond per pound of abrasive. An abrasive wheel is then molded from the mixing in the customary manner, dried, and fired at a temperature in the vicinity of 1000° C. The product does not deform upon firing and does not shrink excessively. It constitutes a highly satisfactory grinding wheel.

A product made as above described, when examined microscopically and analyzed chemically for aluminum and alumina in the bond, is found to contain a trace of opaque particles constituting residual aluminum and giving hydrogen when a weighed powdered sample of the wheel is treated with hydrochloric acid in an analytical gas-evolution apparatus. The total amount of hydrogen so evolved is determined by oxidation to water with red-hot copper oxide and collection and weighing of the water, and corresponds to 0.19% of aluminum, or 0.15% of residual aluminum in the wheel after correction for a blank determination. This corresponds to a little over 1% of residual aluminum in the bond. A small amount of finely divided spherical particles showing double refraction and relatively high index of refraction by microscopic examination are present in the bond, and undoubtedly constitute alumina formed by oxidation of the aluminum. This alumina, under the particular conditions prevailing during the manufacture of this product, has not completely gone into solution in the molten bond glass during firing, although with other types of bond compositions or other firing conditions, it may do so. Also, since B₂O₃ is an important constituent of the type of bond given in Example III, an analysis for boron may be made by fusing a powdered sample of the wheel with sodium carbonate and determining B₂O₃ by the Chapin distillation method and a value close to that calculated theoretically for this particular bond composition will be obtained.

As a guide in the practice of this invention, it is often desirable to choose bonds and protective agents that are in keeping with the chemical nature and reactivity of the oxidizable abrasive grains being bonded. Thus, silicon carbide is essentially acidic in nature and reacts with deleterious swelling much more readily with b. 1s or oxides of strongly basic nature than with those which are acidic. We therefore prefer to choose bonds and protective reagents for silicon carbide that are not of a highly basic nature, in order to reduce chemical reactivity to a minimum. Diamonds, being a form of carbon, are substantially neutral, and the acidic or basic nature of the bonds and protective reagents becomes less important. A protective agent or its oxidation product should not be so chemically active under the conditions of use as to itself attack and decompose the grains being bonded.

The physical form of the protective reagent may be as desired. It may be finely divided or in a flake or other suitable condition. It is ordinarily preferred that it be in the form of an impalpable powder where it is desired that it react rapidly. Its reactivity is dependent not only on its exposure to oxygen but also on the size and shape of the particles, and these will be selected to give the desired protective action for the particular kind of protective material and the size as well as kind of oxidizable abrasive granules used. That is, one method of controlling the rate of oxidation of the oxidizable granules is to vary the particle size of the reagent relative to the particle size of the oxidizable granules so that the oxygen may be continuously and adequately removed from the presence of the grains during the whole time that swelling is likely to take place. If desired, mixtures of different protective reagents may be employed.

So far as certain features of the invention are concerned, that is so far as the feature of protecting the bond itself and making the bond viscous is concerned, the method and the bond formulae may be employed for the bonding of aluminum oxide abrasive products and metal oxide abrasive products generally, for example grinding wheels made of emery, corundum or fused alumina.

It will thus be seen that there has been provided by this invention a method and an article in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

We claim:
1. The method of making an article of ceramic bonded oxidizable abrasive granular material which comprises incorporating in a raw ceramic bond mixture a sufficient amount of a protective reagent which is capable of reacting preferentially with the oxygen within the article and preventing deleterious oxidation of the abrasive grains during the firing operation, shaping an article from a mixture of the grains and bond and firing the same to develop the bond.

2. The method of bonding silicon carbide or diamond grains according to claim 1 in which the protective reagent is a reducing agent capable of and proportioned for combining with the oxygen adjacent to the grains and opposing the access of oxygen to the bond and abrasive interfaces throughout the time of maturing the bond when swelling tends to occur.

3. The method of claim 1 in which the protective reagent is one or more of the group consisting of aluminum, silicon, and reduced boron compounds.

4. The method of making an article of ceramic bonded oxidizable abrasive granular material which comprises incorporating in a raw ceramic bond mixture a sufficient amount of a protective reagent which is capable of reacting with oxidizing gases in the bond during the firing operation, shaping an article from a mixture of the grains and bond and firing the same to develop the bond.

5. The method of claim 4 in which the protective reagent is one or more of the group consisting of aluminum, silicon, and boron.

6. The method of bonding silicon carbide or diamond grains according to claim 1 in which the protective reagent comprises aluminum.

7. The method of bonding silicon carbide or diamond grains according to claim 4 in which the protective reagent comprises aluminum.

8. The method of bonding silicon carbide or diamond grains according to claim 1 in which the protective reagent comprises silicon.

9. The method of bonding silicon carbide or diamond grains according to claim 4 in which the protective reagent comprises silicon.

10. The method of making an article of ceramic bonded oxidizable abrasive granular material which comprises incorporating in a raw ceramic bond mixture a sufficient amount of a reducing reagent with respect to oxidizing gases capable of and proportioned for protecting the abrasive granules and also capable of and proportioned for preventing porosity of the bond, shaping an article from a mixture of the granular material and bond and firing the same to develop the bond.

11. The method of claim 10 in which the raw ceramic bond mixture is fired at a low temperature (below 1100° C.) and at such temperature has constituents of low viscosity, thereby readily wetting and coating the granular material.

12. The method of making an article of ceramic bonded oxidizable abrasive granular material which comprises providing a raw ceramic bond mixture including fluxing material and incorporating in said mixture a sufficient amount of aluminum in comminuted form, adding to the mixture a quantity of the said granular material, shaping an article therefrom, firing the article at a relatively low temperature, the aluminum acting to reduce the fluidity of the ceramic bond mixture as a whole without preventing effective coating of the granular material by reason of the fluxes employed.

13. A ceramic product comprising silicon carbide abrasive grains bonded integrally with a vitrified ceramic bond containing residual aluminum and containing boric oxide.

14. The method of making an abrasive article which comprises providing abrasive grain and ceramic bonding material, mixing with the ceramic bonding material 1% or more of the weight thereof of a reducing agent which forms a non-gaseous oxidation product selected from the group consisting of aluminum, silicon and boron, mixing the abrasive grit with the bond, shaping an article from such mixture, and firing the article, thereby making a fired article which is unswelled and the bond of which is relatively non-porous and non-pumice-like.

15. The method of claim 14 in which the article is fired at a low temperature in the vicinity of 1000° C. and at such temperature the bond has constituents of low viscosity, thereby readily wetting and coating the abrasive material.

LOWELL H. MILLIGAN.
ROBERT H. LOMBARD.

CERTIFICATE OF CORRECTION.

Patent No. 2,132,005.　　　　　　　　　　　　　October 4, 1938.

LOWELL H. MILLIGAN, ET AL.

It is hereby certified that error appears in the printed specification of the above numbered patent requiring correction as follows: Page 3, second column, line 75, strike out the words and period "the bond." and insert the same after "in", line 63; and that the said Letters Patent should be read with this correction therein that the same may conform to the record of the case in the Patent Office.

Signed and sealed this 6th day of December, A. D. 1938.

Henry Van Arsdale
Acting Commissioner of Patents.

(Seal)

bond mixture a sufficient amount of a protective reagent which is capable of reacting preferentially with the oxygen within the article and preventing deleterious oxidation of the abrasive grains during the firing operation, shaping an article from a mixture of the grains and bond and firing the same to develop the bond.

2. The method of bonding silicon carbide or diamond grains according to claim 1 in which the protective reagent is a reducing agent capable of and proportioned for combining with the oxygen adjacent to the grains and opposing the access of oxygen to the bond and abrasive interfaces throughout the time of maturing the bond when swelling tends to occur.

3. The method of claim 1 in which the protective reagent is one or more of the group consisting of aluminum, silicon, and reduced boron compounds.

4. The method of making an article of ceramic bonded oxidizable abrasive granular material which comprises incorporating in a raw ceramic bond mixture a sufficient amount of a protective reagent which is capable of reacting with oxidizing gases in the bond during the firing operation, shaping an article from a mixture of the grains and bond and firing the same to develop the bond.

5. The method of claim 4 in which the protective reagent is one or more of the group consisting of aluminum, silicon, and boron.

6. The method of bonding silicon carbide or diamond grains according to claim 1 in which the protective reagent comprises aluminum.

7. The method of bonding silicon carbide or diamond grains according to claim 4 in which the protective reagent comprises aluminum.

8. The method of bonding silicon carbide or diamond grains according to claim 1 in which the protective reagent comprises silicon.

9. The method of bonding silicon carbide or diamond grains according to claim 4 in which the protective reagent comprises silicon.

10. The method of making an article of ceramic bonded oxidizable abrasive granular material which comprises incorporating in a raw ceramic bond mixture a sufficient amount of a reducing reagent with respect to oxidizing gases capable of and proportioned for protecting the abrasive granules and also capable of and proportioned for preventing porosity of the bond, shaping an article from a mixture of the granular material and bond and firing the same to develop the bond.

11. The method of claim 10 in which the raw ceramic bond mixture is fired at a low temperature (below 1100° C.) and at such temperature has constituents of low viscosity, thereby readily wetting and coating the granular material.

12. The method of making an article of ceramic bonded oxidizable abrasive granular material which comprises providing a raw ceramic bond mixture including fluxing material and incorporating in said mixture a sufficient amount of aluminum in comminuted form, adding to the mixture a quantity of the said granular material, shaping an article therefrom, firing the article at a relatively low temperature, the aluminum acting to reduce the fluidity of the ceramic bond mixture as a whole without preventing effective coating of the granular material by reason of the fluxes employed.

13. A ceramic product comprising silicon carbide abrasive grains bonded integrally with a vitrified ceramic bond containing residual aluminum and containing boric oxide.

14. The method of making an abrasive article which comprises providing abrasive grain and ceramic bonding material, mixing with the ceramic bonding material 1% or more of the weight thereof of a reducing agent which forms a non-gaseous oxidation product selected from the group consisting of aluminum, silicon and boron, mixing the abrasive grit with the bond, shaping an article from such mixture, and firing the article, thereby making a fired article which is unswelled and the bond of which is relatively non-porous and non-pumice-like.

15. The method of claim 14 in which the article is fired at a low temperature in the vicinity of 1000° C. and at such temperature the bond has constituents of low viscosity, thereby readily wetting and coating the abrasive material.

LOWELL H. MILLIGAN.
ROBERT H. LOMBARD.

---

CERTIFICATE OF CORRECTION.

Patent No. 2,132,005.                                      October 4, 1938.

LOWELL H. MILLIGAN, ET AL.

It is hereby certified that error appears in the printed specification of the above numbered patent requiring correction as follows: Page 3, second column, line 75, strike out the words and period "the bond." and insert the same after "in", line 63; and that the said Letters Patent should be read with this correction therein that the same may conform to the record of the case in the Patent Office.

Signed and sealed this 6th day of December, A. D. 1938.

Henry Van Arsdale
Acting Commissioner of Patents.

(Seal)